US012743993B2

(12) United States Patent
Pyo

(10) Patent No.: US 12,743,993 B2
(45) Date of Patent: Sep. 22, 2026

(54) DISPLAY DEVICE AND ELECTRONIC DEVICE INCLUDING DISPLAY DEVICE

(71) Applicant: Samsung Display Co., Ltd., Yongin-Si (KR)

(72) Inventor: Si Beak Pyo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/198,478

(22) Filed: May 5, 2025

(65) Prior Publication Data

US 2026/0065843 A1 Mar. 5, 2026

(30) Foreign Application Priority Data

Aug. 27, 2024 (KR) ........................ 10-2024-0115149

(51) Int. Cl.
*G09G 3/32* (2016.01)

(52) U.S. Cl.
CPC ....... *G09G 3/32* (2013.01); *G09G 2300/0819* (2013.01); *G09G 2320/0233* (2013.01); *G09G 2320/0242* (2013.01); *G09G 2330/028* (2013.01)

(58) Field of Classification Search
CPC ............. G09G 3/32; G09G 2300/0819; G09G 2320/0233; G09G 2320/0242; G09G 2330/028
See application file for complete search history.

(56) References Cited

U.S. PATENT DOCUMENTS

| | | | | |
|---|---|---|---|---|
| 7,436,413 B2 * | 10/2008 | Kanai | G09G 3/2081 | 348/625 |
| 10,854,144 B2 | 12/2020 | Pyo et al. | | |
| 12,051,360 B2 * | 7/2024 | Kim | G09G 5/10 | |
| 12,361,876 B2 * | 7/2025 | Park | G09G 3/3291 | |
| 2007/0057975 A1 * | 3/2007 | Oh | G09G 3/3648 | 345/690 |
| 2014/0285406 A1 * | 9/2014 | Kimura | G09G 3/3291 | 345/76 |
| 2014/0285537 A1 * | 9/2014 | Kimura | G09G 3/3291 | 345/77 |
| 2015/0364076 A1 * | 12/2015 | Park | G09G 3/2081 | 345/77 |
| 2016/0148560 A1 * | 5/2016 | Tsai | H10K 50/13 | 345/83 |
| 2016/0189635 A1 * | 6/2016 | Lee | G09G 3/3291 | 345/77 |

(Continued)

FOREIGN PATENT DOCUMENTS

| | | | |
|---|---|---|---|
| KR | 20230085520 A * | 6/2023 | G09G 5/003 |
| KR | 1020230085520 A | 6/2023 | |

*Primary Examiner* — Vinh T Lam

(74) *Attorney, Agent, or Firm* — Innovation Counsel LLP

(57) ABSTRACT

A display device may include a display panel including a plurality of sub-pixels, a voltage generator configured to generate a first voltage including first voltage levels, the first voltage levels corresponding to representative luminance levels among luminance levels, and a voltage interpolator configured to output interpolation voltage levels corresponding to the luminance levels to the display panel, based on the first voltage levels, and the luminance levels may be values obtained by converting luminances of an image displayed on the display panel into a digital form.

18 Claims, 6 Drawing Sheets

(56) References Cited

U.S. PATENT DOCUMENTS

| | | | | |
|---|---|---|---|---|
| 2019/0066555 | A1* | 2/2019 | Gu | G09G 3/006 |
| 2019/0088199 | A1* | 3/2019 | Zhang | G09G 3/3208 |
| 2019/0088205 | A1* | 3/2019 | Zhang | G09G 3/3233 |
| 2019/0180702 | A1* | 6/2019 | Kim | G09G 3/3233 |
| 2019/0266952 | A1* | 8/2019 | Pyo | G09G 3/3291 |
| 2020/0251045 | A1* | 8/2020 | An | G09G 3/32 |
| 2020/0388225 | A1* | 12/2020 | Kim | G09G 3/3258 |
| 2022/0101772 | A1* | 3/2022 | Wetherell | G09G 3/2007 |
| 2023/0089942 | A1* | 3/2023 | Shi | G09G 3/2007<br>345/690 |
| 2023/0111814 | A1* | 4/2023 | Lee | G09G 3/2007<br>345/74.1 |
| 2023/0133826 | A1* | 5/2023 | Lee | G09G 3/32<br>345/55 |
| 2023/0139147 | A1* | 5/2023 | Chae | G09G 3/32<br>345/55 |
| 2023/0186816 | A1* | 6/2023 | Min | G09G 3/2007<br>345/690 |
| 2023/0317029 | A1* | 10/2023 | Shigeta | G09G 3/3696<br>345/55 |
| 2023/0368743 | A1* | 11/2023 | Pyun | G09G 3/3291 |
| 2024/0096275 | A1* | 3/2024 | Gandhi | G09G 3/3648 |
| 2024/0135864 | A1* | 4/2024 | Lee | G09G 3/32 |
| 2024/0321226 | A1* | 9/2024 | Wang | G09G 3/36 |
| 2024/0404445 | A1* | 12/2024 | Young | G09G 3/2003 |
| 2025/0174175 | A1* | 5/2025 | Kim | G09G 3/32 |

* cited by examiner

FIG. 3

| # of DBV | DBV | Luminance[nits] | OV1 | OV2 |
|---|---|---|---|---|
| 1 | 117 | 4 | V1_1 | V2_1 |
| 2 | 177 | 10 | V1_2 | V2_2 |
| 3 | 213 | 15 | V1_3 | V2_3 |
| 4 | 292 | 30 | V1_4 | V2_4 |
| 5 | 400 | 50 | V1_5 | V2_5 |
| 6 | 481 | 90 | V1_6 | V2_6 |
| 7 | 505 | 100 | V1_7 | V2_7 |
| 8 | 692 | 200 | V1_8 | V2_8 |
| 9 | 832 | 300 | V1_9 | V2_9 |
| 10 | 1182 | 650 | V1_10 | V2_10 |
| 11 | 1562 | 1200 | V1_11 | V2_11 |
| 12 | 1780 | 1600 | V1_12 | V2_12 |
| 13 | 2047 | 2175 | V1_13 | V2_13 |

DISPLAY DEVICE AND ELECTRONIC DEVICE INCLUDING DISPLAY DEVICE

This application claims priority to Korean Patent Application No. 10-2024-0115149, filed on Aug. 27, 2024, and all the benefits accruing therefrom under 35 U.S.C. § 119, the content of which in its entirety is herein incorporated by reference.

BACKGROUND

1. Field

An embodiment of the disclosure relates to a display device and an electronic device including the display device.

2. Description of the Related Art

A display device includes a display panel and a driver. The display panel includes a pixel connected to a scan line and a data line. The driver includes a scan driver that provides a scan signal to the scan line and a data driver that provides a data signal to the data line. The pixel emit light with a luminance corresponding to the data signal provided through the data line in response to the scan signal provided through the scan line.

The data driver generates gamma voltages corresponding to the entire grayscales and outputs a data signal corresponding to a grayscale value of image data using the gamma voltages. Since a step size between voltages for pixel driving is large compared to a step size between the gamma voltages, luminance uniformity according to an image brightness value may be deteriorated.

SUMMARY

An object of the disclosure is to prevent deterioration of luminance uniformity according to an image brightness value by providing voltages corresponding to luminance levels to pixels.

According to an embodiment of the disclosure, a display device may include a display panel including a plurality of sub-pixels, in which a voltage generator is configured to generate a first voltage including first voltage levels, the first voltage levels corresponding to representative luminance levels among luminance levels, and a voltage interpolator configured to output interpolation voltage levels corresponding to the luminance levels to the display panel, based on the first voltage levels, and the luminance levels may be values obtained by converting luminances of an image displayed on the display panel into a digital form.

According to embodiments, the voltage interpolator may include a voltage distribution circuit including y resistors connected in series between a first node and a ground node, and outputting a plurality of interpolation voltage levels, where y is a natural number greater than 1, a first voltage output circuit receiving a k-th voltage level corresponding to a k-th representative luminance level among the representative luminance levels from the voltage generator, and outputting the k-th voltage level to one of a plurality of nodes between the first node and the ground node according to the number of luminance levels between the k-th representative luminance level and a (k+1)-th representative luminance level among the representative luminance levels, where k is a natural number greater than 1, and a second voltage output circuit receiving the (k+1)-th voltage level corresponding to the (k+1)-th representative luminance level from the voltage generator and outputting the (k+1)-th voltage level to the first node.

According to embodiments, the voltage distribution circuit may perform voltage distribution on the k-th voltage level and the (k+1)-th voltage level to generate the interpolation voltage levels, and the interpolation voltage levels may have a voltage level between the k-th voltage level and the (k+1)-th voltage level.

According to embodiments, the number of luminance levels between the k-th representative luminance level and the (k+1)-th representative luminance level and the number of interpolation voltage levels output from the voltage distribution circuit may be the same.

According to embodiments, the first voltage output circuit may output the k-th voltage level to one of the plurality of nodes between the first node and the ground node so that a value obtained by subtracting the k-th representative luminance level from the (k+1)-th representative luminance level is equal to the number of resistors connected between the one of a plurality of nodes and the first node, where k is a natural number greater than 1 and less than y.

According to embodiments, the first voltage output circuit may include a demultiplexer.

According to embodiments, the first voltage may be one of a voltage for initializing an anode electrode of a light emitting element included in the sub-pixel, a turn-off voltage for an N-type transistor included in the sub-pixel, and a voltage for initializing a gate electrode of a driving transistor included in the sub-pixel.

According to embodiments, the driving transistor may generate a driving current flowing from a first power voltage node to which a first power voltage is provided to a second power voltage node to which a second power voltage is provided.

According to embodiments, the voltage interpolator may output interpolation voltage levels corresponding to the luminance levels to the display panel based on second voltage levels of a second voltage from an outside, and the second voltage levels may correspond to the representative luminance levels.

According to embodiments, the second voltage may be one of the second power voltage and a turn-on voltage of a P-type transistor included in the sub-pixel.

According to embodiments, the y may be equal to a greatest value among the values obtained by subtracting the k-th representative luminance level from the (k+1)-th representative luminance level.

According to embodiments, a voltage level difference between adjacent interpolation voltage levels may be equal to each other.

According to embodiments, the voltage level difference between the adjacent interpolation voltage levels may be less than a voltage level difference between the k-th voltage level and the (k+1)-th voltage level.

According to embodiments, the display device may further include a controller configured to output a first voltage control signal to the voltage generator and a second voltage control signal to the voltage interpolator.

According to embodiments, the first voltage output circuit may receive a control signal including information on the k from the controller, and the control signal may be included in the second voltage control signal.

According to an embodiment of the disclosure, an electronic device comprising a processor to provide input image data, and a display device to display an image based on the input image data, wherein the display device comprising a display panel including a plurality of sub-pixels, a voltage generator configured to generate a first voltage including first voltage levels, the first voltage levels corresponding to representative luminance levels among luminance levels, and a voltage interpolator configured to output interpolation voltage levels corresponding to the luminance levels to the display panel based on the first voltage levels, wherein the luminance levels are values obtained by converting luminances of an image displayed on the display panel into a digital form.

According to embodiments, the voltage interpolator comprises a voltage distribution circuit including y resistors connected in series between a first node and a ground node, and outputting a plurality of interpolation voltage levels, where y is a natural number greater than 1, a first voltage output circuit receiving a k-th voltage level corresponding to a k-th representative luminance level among the representative luminance levels from the voltage generator, and outputting the k-th voltage level to one of a plurality of nodes between the first node and the ground node according to the number of luminance levels between the k-th representative luminance level and a (k+1)-th representative luminance level among the representative luminance levels, where k is a natural number greater than 1, and a second voltage output circuit receiving the (k+1)-th voltage level corresponding to the (k+1)-th representative luminance level from the voltage generator and outputting the (k+1)-th voltage level to the first node.

According to embodiments, the voltage distribution circuit performs voltage distribution on the k-th voltage level and the (k+1)-th voltage level to generate the interpolation voltage levels, and the interpolation voltage levels have a voltage level between the k-th voltage level and the (k+1)-th voltage level.

According to embodiments, the number of luminance levels between the k-th representative luminance level and the (k+1)-th representative luminance level and the number of interpolation voltage levels output from the voltage distribution circuit are the same.

According to embodiments, the first voltage output circuit outputs the k-th voltage level to one of the plurality of nodes between the first node and the ground node so that a value obtained by subtracting the k-th representative luminance level from the (k+1)-th representative luminance level is equal to the number of resistors connected between the one of a plurality of nodes and the first node, where k is a natural number greater than 1 and less than y.

A display device according to an embodiment of the disclosure may prevent deterioration of luminance uniformity according to an image brightness value by providing voltages corresponding to luminance levels to pixels.

BRIEF DESCRIPTION OF THE DRAWINGS

The above and other features of the disclosure will become more apparent by describing in further detail embodiments thereof with reference to the accompanying drawings, in which:

FIG. 3 is a diagram illustrating an example of a representative luminance level, first voltage levels, and second voltage levels;

DETAILED DESCRIPTION OF THE EMBODIMENT

Figure 1:
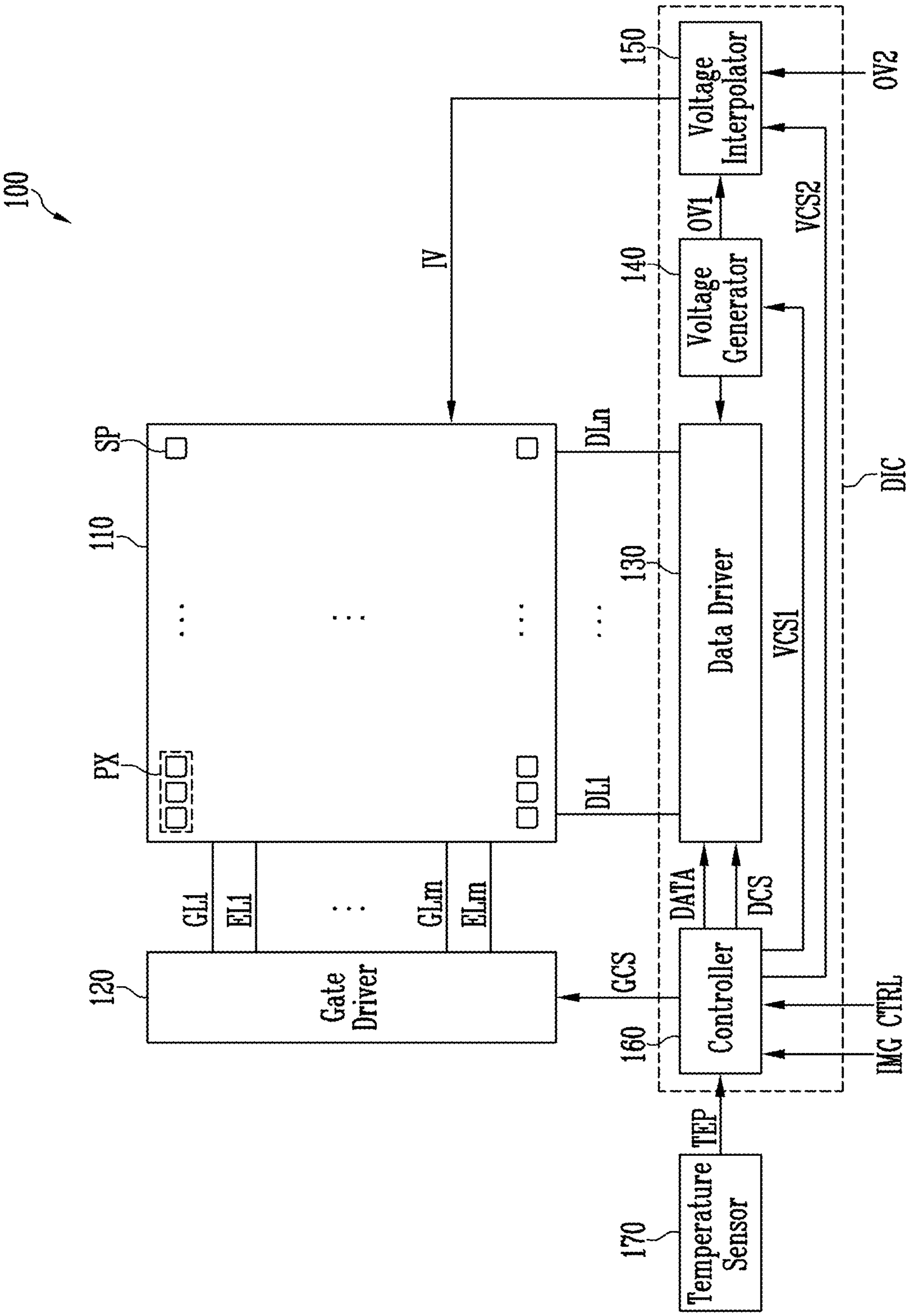
FIG. 1 is a block diagram illustrating an embodiment of a display device.

Hereinafter, a preferred embodiment according to the disclosure is described in detail with reference to the accompanying drawings. It should be noted that in the following description, only portions necessary for understanding an operation according to the disclosure are described, and descriptions of other portions are omitted in order not to obscure the subject matter of the disclosure. In addition, the disclosure may be embodied in other forms without being limited to the embodiment described herein. However, the embodiment described herein is provided to describe in detail enough to easily implement the technical spirit of the disclosure to those skilled in the art to which the disclosure belongs.

Throughout the specification, in a case where a portion is "connected" to another portion, the case includes not only a case where the portion is "directly connected" but also a case where the portion is "indirectly connected" with another element interposed therebetween. Terms used herein are for describing specific embodiments and are not intended to limit the disclosure. Throughout the specification, in a case where a certain portion "includes", the case means that the portion may further include another component without excluding another component unless otherwise stated. "At least any of X, Y, and Z" and "at least any selected from a group consisting of X, Y, and Z" may be interpreted as one X, one Y, one Z, or any combination of two or more of X, Y, and Z (for example, XYZ, XYY, YZ, and ZZ). Here, "and/or" includes all combinations of one or more of corresponding configurations.

Here, terms such as first and second may be used to describe various components, but these components are not limited to these terms. These terms are used to distinguish one component from another component. Therefore, a first component may refer to a second component within a range without departing from the scope disclosed herein.

In addition, terms such as "unit", "module", and the like used hereinafter or functional blocks shown in the drawings may be implemented in a form of a software configuration, a hardware configuration, or a combination thereof. In order to clearly describe the technical spirit of the disclosure, a detailed description of overlapping components is omitted.

FIG. 1 is a block diagram illustrating an embodiment of a display device.

Referring to FIG. 1, the display device 100 may include a display panel 110, a gate driver 120, a data driver 130, a voltage generator 140, a voltage interpolator 150, and a controller 160.

The display panel 110 includes sub-pixels SP. The sub-pixels SP may be connected to the gate driver 120 through first to m-th gate lines GL1 to GLm. The sub-pixels SP may be connected to the data driver 130 through first to n-th data lines DL1 to DLn.

Each of the sub-pixels SP may include at least one light emitting element configured to generate light. Accordingly, each of the sub-pixels SP may generate light of a specific color such as red, green, blue, cyan, magenta, or yellow. Two or more sub-pixels among the sub-pixels SP may constitute one pixel PX. For example, as shown in FIG. 1, three sub-pixels may constitute one pixel PX.

The gate driver 120 is connected to the sub-pixels SP arranged in a row direction through the first to m-th gate lines GL1 to GLm. The gate driver 120 may output gate signals to the first to m-th gate lines GL1 to GLm in response to a gate control signal GCS. In embodiments, the gate control signal GCS may include a start signal indicating a start of each frame, a horizontal synchronization signal for outputting the gate signals in synchronization with a timing at which data signals are applied, and the like.

In embodiments, first to m-th emission control lines EL1 to ELm connected to the sub-pixels SP arranged in the row direction may be further provided. In this case, the gate driver 120 may include an emission control driver configured to control the first to m-th emission control lines EL1 to ELm, and the emission control driver may operate under control of the controller 160.

The gate driver 120 may be disposed on one side of the display panel 110. However, embodiments are not limited thereto. For example, the gate driver 120 may include two or more physically and/or logically divided drivers, and such drivers may be disposed on one side of the display panel 110 and another side of the display panel 110 opposite the one side. As described above, the gate driver 120 may be disposed around the display panel 110 in various shapes according to embodiments.

The data driver 130 is connected to the sub-pixels SP arranged in a column direction through the first to n-th data lines DL1 to DLn. The data driver 130 receives image data DATA and a data control signal DCS from the controller 160. The data driver 130 operates in response to the data control signal DCS. In embodiments, the data control signal DCS may include a source start pulse, a source shift clock, a source output enable signal, and the like.

The data driver 130 may apply data signals having grayscale voltages corresponding to the image data DATA to the first to n-th data lines DL1 to DLn using voltages from the voltage generator 140.

In embodiments, the data driver 130 may convert an input grayscale value included in the image data DATA into a voltage value using a lookup table. The voltage value may be a data value of a voltage domain. A preset lookup table may not store voltage values corresponding to the entire luminances but may store voltage values corresponding to representative luminances only.

The voltage value may include information on one of gamma voltages. The gamma voltages may be voltages adjusted so that a brightness and a color of an image displayed on the display panel 110 match an actual input signal. For example, a relationship between the input grayscale value and the voltage value may correspond to or match a 2.2 gamma curve.

When the gate signal is applied to each of the first to m-th gate lines GL1 to GLm, the data signals corresponding to the image data DATA may be applied to the data lines DL1 to DLm. Accordingly, the corresponding sub-pixels SP may generate light corresponding to the data signals. Accordingly, an image is displayed on the display panel 110.

In embodiments, the gate driver 120 and the data driver 130 may include complementary metal-oxide semiconductor (CMOS) circuit elements.

The voltage generator 140 may operate in response to a first voltage control signal VCS1 from the controller 160. The voltage generator 140 may generate a first voltage OV1 and provide the generated voltage to the voltage interpolator 150.

For example, the voltage generator 140 may be configured to receive an input voltage from an outside of the display device 100, adjust the received voltage, and generate the first voltage OV1 by regulating the adjusted voltage. The first voltage OV1 may be one of an initialization voltage of the sub-pixel SP of the display panel 110 and a turn-off voltage of an N-type transistor included in the sub-pixel SP.

However, the voltage generator 140 may generate first voltage levels of the first voltage OV1 for representative luminance levels corresponding to the representative luminance among luminance levels (for example, 13 voltage levels for 13 representative luminance levels). A more detailed description of this is described later with reference to FIG. 3.

The luminance level may be a value obtained by converting a display luminance into a digital form. The display luminance is a luminance of an image displayed on the display panel 110. The display luminance may be determined by a user's setting or a processor of the display device.

The controller 160 may receive a signal corresponding to the display luminance and convert the signal into the luminance level of the digital form. For example, a display luminance that is emitted up to about 2175 nits may be divided into a luminance level of 11 bits. However, this is exemplary, and a maximum luminance and the luminance level of the display luminance are not limited thereto.

The voltage interpolator 150 may operate in response to a second voltage control signal VCS2 from the controller 160. The voltage interpolator 150 may perform an interpolation operation on the first voltage OV1 received from the voltage generator 140 and a second voltage OV2 received from the outside of the display device 100.

The voltage interpolator 150 may receive second voltage levels of the second voltage OV2 for the representative luminance levels from the outside (for example, 13 voltage levels for 13 representative luminance levels). The second voltage OV2 may be one of a power voltage applied to a pixel included in the display panel 110 and a turn-on voltage of a P-type transistor included in the pixel.

The voltage interpolator 150 may perform an interpolation operation in all luminance levels for the first voltage OV1 and the second voltage OV2. That is, the voltage interpolator 150 may perform the interpolation operation with respect to the first voltage levels of the first voltage OV1 to generate interpolation voltage levels IV corresponding to all luminance levels. In addition, the voltage interpolator 150 may perform an interpolation operation on the second voltage levels of the second voltage OV2 to generate interpolation voltage levels IV corresponding to all luminance levels.

The controller 160 controls overall operations of the display device 100. The controller 160 receives input image data IMG and a control signal CTRL for controlling display of the input image data IMG from the outside of the display device 100. The controller 160 may provide the gate control signal GCS, the data control signal DCS, the first voltage control signal VCS1, and the second voltage control signal VCS2 in response to the control signal CTRL.

The controller 160 may convert the input image data IMG to the image data DATA suitable for the display device 100 or the display panel 110 and output the image data DATA to the data driver 130. In embodiments, the controller 160 may output the image data DATA by aligning the input image data IMG to be suitable for the sub-pixels SP of a row unit.

Two or more components of the data driver 130, the voltage generator 140, the voltage interpolator 150, and the controller 160 may be embedded in one integrated circuit. As shown in FIG. 1, the data driver 130, the voltage generator 140, the voltage interpolator 150, and the controller 160 may be embedded in one driver integrated circuit DIC.

In this case, the data driver 130, the voltage generator 140, the voltage interpolator 150, and the controller 160 may be functionally divided components in the one driver integrated circuit DIC. In other embodiments, at least one of the data driver 130, the voltage generator 140, the voltage interpolator 150, and the controller 160 may be provided as a component distinguished from the driver integrated circuit DIC.

The display device 100 may include at least one temperature sensor 170. The temperature sensor 170 is configured to sense a temperature around the temperature sensor 170 and generate temperature data TEP indicating the sensed temperature. In embodiments, the temperature sensor 170 may be disposed adjacent to the display panel 110 and/or the driver integrated circuit DIC.

The controller 160 may control various operations of the display device 100 in response to the temperature data TEP. In embodiments, the controller 160 may adjust a luminance of the image output from the display panel 110 in response to the temperature data TEP.

Figure 2:
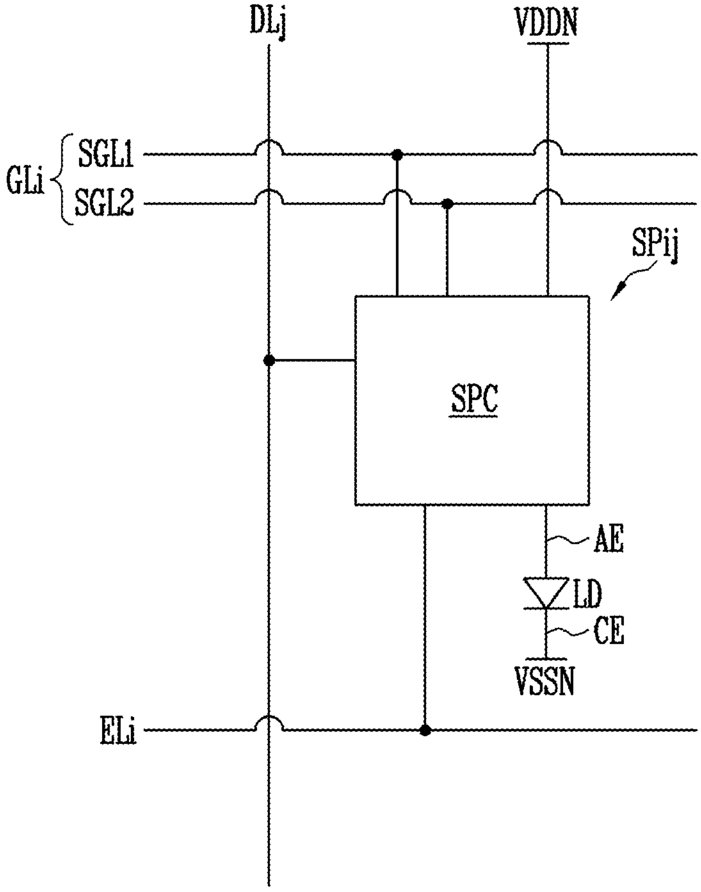
FIG. 2 is a block diagram illustrating an embodiment of sub-pixels of FIG. 1.

FIG. 2 is a block diagram illustrating an embodiment of one of the sub-pixels of FIG. 1. In FIG. 2, among the sub-pixels SP of FIG. 1, a sub-pixel SPij arranged in an i-th row (i is an integer greater than or equal to 1 and less than or equal to m) and a j-th column (j is an integer greater than or equal to 1 and less than or equal to n) is shown as an example.

Referring to FIG. 2, the sub-pixel SPij may include a sub-pixel circuit SPC and a light emitting element LD.

The light emitting element LD is connected between a first power voltage node VDDN and a second power voltage node VSSN. The first power voltage node VDDN is a node that transmits a first power voltage and the second power voltage node VSSN is a node that transmits a second power voltage.

The first power voltage may have a relatively high voltage level and the second power voltage may have a voltage level lower than that of the first power voltage. The first power voltage VDD or the second power voltage VSS may be provided by an external device of the display device 100. For example, the first power voltage or the second power voltage may be received from a power management integrated circuit (PMIC).

An anode electrode AE of the light emitting element LD may be connected to the first power voltage node VDDN through the sub-pixel circuit SPC, and a cathode electrode CE of the light emitting element LD may be connected to the second power voltage node VSSN. For example, the anode electrode AE of the light emitting element LD may be connected to the first power voltage node VDDN through one or more transistors included in the sub-pixel circuit SPC.

The sub-pixel circuit SPC may be connected to an i-th gate line GLi among the first to m-th gate lines GL1 to GLm of FIG. 1, an i-th emission control line ELi among the first to m-th emission control lines EL1 to ELm of FIG. 1, and a j-th data line DLj among the first to n-th data lines DL1 to DLn of FIG. 1. The sub-pixel circuit SPC is configured to control the light emitting element LD according to signals received through signal lines described above.

The sub-pixel circuit SPC may operate in response to a gate signal received through the i-th gate line GLi. The i-th gate line GLi may include one or more sub-gate lines. In embodiments, as shown in FIG. 2, the i-th gate line GLi may include first and second sub-gate lines SGL1 and SGL2. The sub-pixel circuit SPC may operate in response to gate signals received through the first and second sub-gate lines SGL1 and SGL2. As described above, when the i-th gate line GLi includes two or more sub-gate lines, the sub-pixel circuit SPC may operate in response to gate signals received through corresponding sub-gate lines.

The sub-pixel circuit SPC may operate in response to an emission control signal received through the i-th emission control line ELi. In embodiments, the i-th emission control line ELi may include one or more sub-emission control lines. When the i-th emission control line ELi includes two or more sub-emission control lines, the sub-pixel circuit SPC may operate in response to emission control signals received through corresponding sub-emission control lines.

The sub-pixel circuit SPC may receive a data signal through the j-th data line DLj. The sub-pixel circuit SPC may store a voltage corresponding to the data signal in response to at least one of gate signals received through the first and second sub-gate lines SGL1 and SGL2. The sub-pixel circuit SPC may control a current flowing from the first power voltage node VDDN to the second power voltage node VSSN through the light emitting element LD according to the stored voltage in response to the emission control signal received through the i-th emission control line ELi. Accordingly, the light emitting element LD may generate light of a luminance corresponding to the data signal.

In embodiments, the first voltage OV1 of FIG. 1 may include a voltage initializing the anode electrode AE of the light emitting element LD, a turn-off voltage of an N-type transistor included in the sub-pixel circuit SPC, and a voltage initializing a gate electrode of a driving transistor included in the sub-pixel circuit SPC. The driving transistor may be a transistor generating a driving current flowing from the first power voltage node VDDN to the second power voltage node VSSN based on the data signal.

The second voltage OV2 of FIG. 1 may include the second power voltage provided to the second power voltage node VSSN and a turn-on voltage of a P-type transistor included in the sub-pixel circuit SPC.

FIG. 3 is a diagram illustrating an example of a representative luminance level, first voltage levels, and second voltage levels.

Referring to FIG. 3, when a display luminance emitted up to about 2175 nits is divided into a luminance level of 11 bits, first to thirteenth representative luminances among the entire display luminances, and first to thirteenth representative luminance levels DBV among the entire luminance levels are shown.

In addition, referring to FIGS. 3, 13 first voltage levels V1_1 to V1_13 and 13 second voltage levels V2_1 to V2_13 corresponding to the representative luminances and the representative luminance levels DBV are shown. However, this is only an example for convenience of description, and the number of representative luminances and representative luminance levels may vary according to embodiments.

The first voltage OV1 may have only 13 first voltage levels V1_1 to V1_13 corresponding to the representative luminance levels DBV. For example, the first voltage OV1 corresponding to luminance levels between a first representative luminance level (that is, '117') and a second representative luminance level '177' may have the first voltage level V1_1.

In embodiments, the first voltage levels V1_1 to V1_13 may be inversely proportional to the representative luminance levels DBV. That is, as the representative luminance level DBV increases, the first voltage levels V1_1 to V1_13 may decrease. For example, the first voltage level V1_11 corresponding to an eleventh representative luminance level (that is, '1562' may be less than the first voltage level V1_10 corresponding to a tenth representative luminance level (that is, '1182').

In embodiments, the second voltage levels V2_1 to V2_13 may be inversely proportional to the representative luminance levels DBV. That is, as the representative luminance level DBV increases, the second voltage levels V2_1 to V2_13 may decrease. For example, the second voltage level V2_11 corresponding to the eleventh representative luminance level (that is, '1562') may be less than the second voltage level V2_10 corresponding to the tenth representative luminance level (that is, '1182').

Differently from the first voltage levels V1_1 to V1_13 and the second voltage levels V2_1 to V2_13 determined only with respect to the first to thirteenth representative luminance levels, a voltage level of a gamma voltage may be determined with respect to a larger number of luminance levels.

Accordingly, a step size between the first voltage levels V1_1 to V1_13 and the second voltage levels V2_1 to V2_13 may be 100 times greater than a step size of the gamma voltage.

A step size may refer to a size when a voltage level changes. For example, a voltage size difference between the first voltage level V1_11 corresponding to the eleventh representative luminance level (that is, '1562') and the first voltage level V1_10 corresponding to the tenth representative luminance level (that is, '1182') may be referred to as the step size.

Due to a step size difference between the first voltage levels V1_1 to V1_13 and the second voltage levels V2_1 to V2_13 and the gamma voltage, a luminance of the display panel and uniformity of color coordinates may be deteriorated.

Accordingly, not only the first voltage levels V1_1 to V1_13 and the second voltage levels V2_1 to V2_13 corresponding to the first to thirteenth representative luminance levels, but also voltage levels of the first voltage OV1 and voltage levels of the second voltage OV2 corresponding to all luminance levels may be required.

Figure 4:
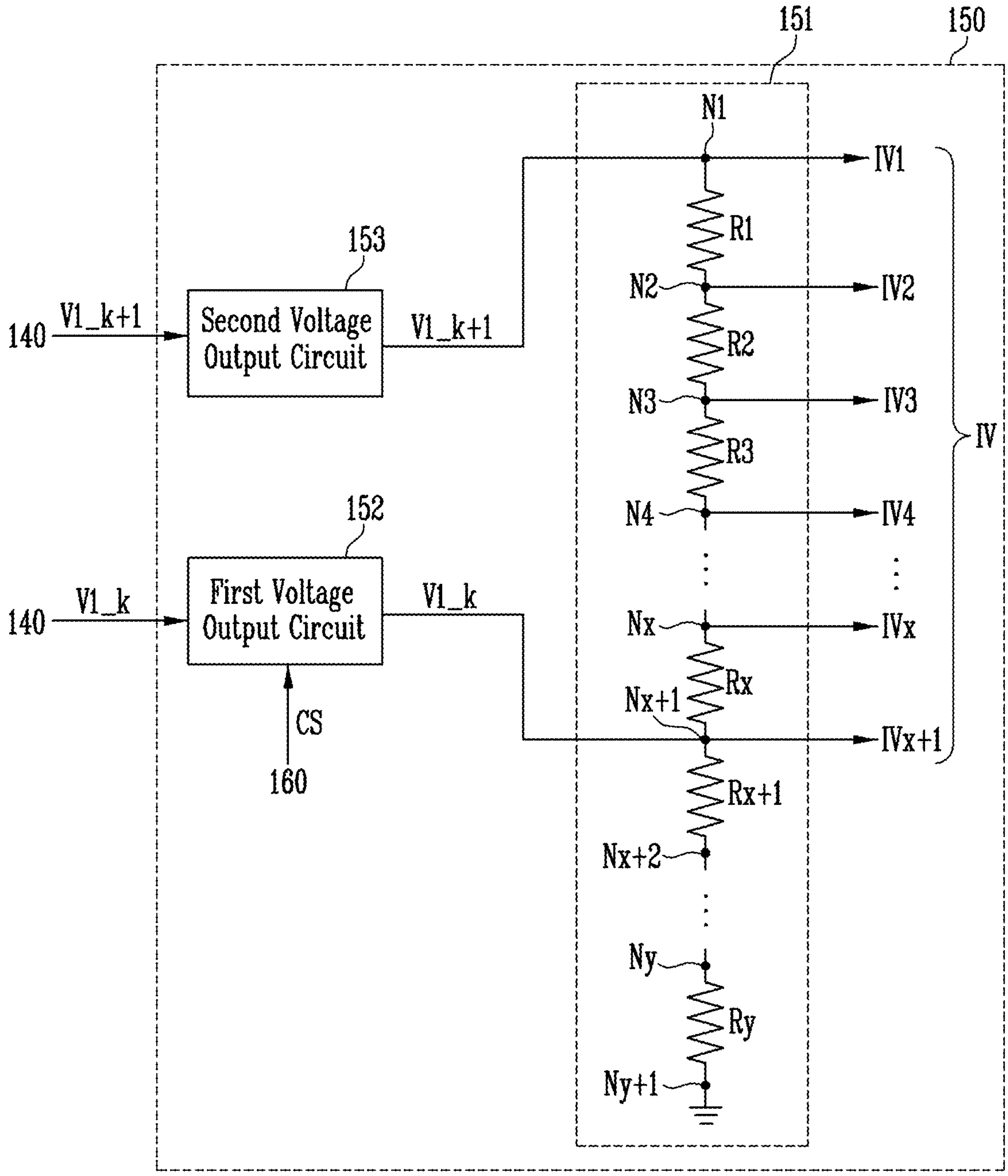
FIG. 4 is a circuit diagram illustrating an embodiment of a voltage interpolator of FIG. 1.

FIG. 4 is a circuit diagram illustrating an embodiment of the voltage interpolator of FIG. 1.

Referring to FIG. 4, the voltage interpolator 150 may include a voltage distribution circuit 151, a first voltage output circuit 152, and a second voltage output circuit 153.

In embodiments, the voltage distribution circuit 151 may include y resistors R1 to Ry connected in series between a first node N1 and a (y+1)-th node Ny+1. The y resistors R1 to Ry may have the same resistance value.

A first resistor R1 may be connected between the first node N1 and a second node N2, a second resistor R2 may be connected between the second node N2 and a third node N3, an x-th resistor may be connected between an x-th node Nx and an (x+1)-th node Nx+1, and a y-th resistor Ry may be connected between a y-th node Ny and a (y+1)-th node Ny+1. The (y+1)-th node Ny+1 may be a ground node to which ground power is applied. x may be a natural number greater than 1, and y may be a natural number greater than x.

The first voltage output circuit 152 may receive a k-th voltage level V1_*k* from the voltage generator 140 of FIG. 1. Referring to FIG. 3, the k-th voltage level V1_*k* may be a voltage level corresponding to a k-th representative luminance level among the first voltage levels V1_1 to V1_13. For example, when k is '9', the k-th voltage level V1_*k* may be a voltage level V1_9 corresponding to a ninth representative luminance level (that is, '832'). k may be a natural number greater than 1.

The first voltage output circuit 152 may receive an output control signal CS from the controller 160. The output control signal CS may be included in the second voltage control signal VCS2 of FIG. 1. The output control signal CS may include information on an order of a representative luminance level corresponding to the k-th voltage level V1_*k* among the entire representative luminance levels. That is, the output control signal CS may include information on 'k'.

The first voltage output circuit 152 may calculate the number of luminance levels between the k-th representative luminance level and the (k+1)-th representative luminance level based on the output control signal CS.

The first voltage output circuit 152 may output the k-th voltage level V1_*k* to one of the first to (y+1)-th nodes N1 to Ny+1 of the voltage distribution circuit 151 according to the number of luminance levels between the k-th representative luminance level and the (k+1)-th representative luminance level.

The second voltage output circuit 153 may receive the (k+1)-th voltage level V1_*k*+1 from the voltage generator 140 of FIG. 1. The second voltage output circuit 153 may output the (k+1)-th voltage level V1_*k*+1 to the first node N1 of the voltage distribution circuit 151.

Referring to FIG. 3, when k is 5, the number of luminance levels between the k-th representative luminance level '400' and the (k+1)-th representative luminance level '481' may be 82.

The first voltage output circuit 152 may output the k-th voltage level V1_*k* to one of the first to (y+1)-th nodes N1 to Ny+1 of the voltage distribution circuit 151 so that the number of luminance levels between the k-th representative luminance level and the (k+1)-th representative luminance level is equal to the number of interpolation voltage levels output from the voltage distribution circuit 151.

In embodiments, the first voltage output circuit 152 may include a demultiplexer. The demultiplexer included in the first voltage output circuit 152 may operate based on the output control signal CS.

The first voltage output circuit 152 may output the k-th voltage level V1_*k* to one of the first to (y+1)-th nodes N1 to Ny+1 of the voltage distribution circuit 151 so that a value obtained by subtracting the k-th representative luminance level from the (k+1)-th representative luminance level is equal to the number of the first to x-th resistors R1 to Rx.

For example, when k is '5', based on a fact that a value obtained by subtracting the k-th representative luminance level '400' from the (k+1)-th representative luminance level '481' is '81', the first voltage output circuit 152 may output the k-th voltage level V1_*k* to a 82-th node among the first to (y+1)-th nodes N1 to Ny+1.

In embodiments, 'y' may be equal to the largest value among the values obtained by subtracting the k-th representative luminance level from the (k+1)-th representative luminance level. Referring to FIG. 3, the largest value among the values obtained by subtracting the k-th representative luminance level from the (k+1)-th representative luminance level may be '380' when k is 10. In this case, the voltage distribution circuit 151 may include 380 resistors.

The voltage distribution circuit 151 may perform voltage distribution on the (k+1)-th voltage level V1_*k*+1 received at the first node N1 and the k-th voltage level V1_*k* received at the (x+1)-th node Nx+1. The voltage distribution circuit 151 may perform voltage distribution to output first to (x+1)-th interpolation voltage levels IV1 to IVx+1 having a voltage level between the (k+1)-th voltage level V1_k+1 and the k-th voltage level V1_k.

The first interpolation voltage level IV1 may be equal to the (k+1)-th voltage level V1_k+1, and the (x+1)-th interpolation voltage level IVx+1 may be equal to the k-th voltage level V1_k.

Voltage level differences between adjacent interpolation voltage levels of the first to (x+1)-th interpolation voltage levels IV1 to IVx+1 may be equal to each other. For example, a voltage level difference between the first interpolation voltage level IV1 and the second interpolation voltage level IV2 may be equal to a voltage level difference between the second interpolation voltage level IV2 and the third interpolation voltage level IV3.

In addition, the voltage level difference between the adjacent interpolation voltage levels of the first to (x+1)-th interpolation voltage levels IV1 to IVx+1 may be less than a voltage level difference between adjacent first voltage levels of the k-th voltage level V1_k and the (k+1)-th voltage level V1_k+1.

Although FIG. 4 shows the voltage interpolator 150 performing an interpolation operation on the first voltage OV1 received from the voltage generator 140, the disclosure is not limited thereto. Similar to that described with reference to FIG. 4, the voltage interpolator 150 may perform an interpolation operation on the second voltage OV2 received from the outside.

For example, the first voltage output circuit 152 may receive a voltage level corresponding to the k-th representative luminance level among the second voltage levels V2_1 to V2_13 from the outside. The second voltage output circuit 153 may receive a voltage level corresponding to the (k+1)-th representative luminance level among the second voltage levels V2_1 to V2_13 from the outside.

The first voltage output circuit 152 may receive the output control signal CS from the controller 160. The first voltage output circuit 152 may calculate the number of luminance levels between the k-th representative luminance level and the (k+1)-th representative luminance level based on the output control signal CS.

The first voltage output circuit 152 may output the k-th voltage level of the second voltage OV2 to one of the first to (y+1)-th nodes N1 to Ny+1 of the voltage distribution circuit 151 so that the value obtained by subtracting the k-th representative luminance level from the (k+1)-th representative luminance level is equal to the number between the first to x-th resistors R1 to Rx.

The second voltage output circuit 153 may output the (k+1)-th voltage level of the second voltage OV2 to the first node N1 of the voltage distribution circuit 151.

The voltage distribution circuit 151 may perform voltage distribution based on the (k+1)-th voltage level received at the first node N1 and the k-th voltage level received at the (x+1)-th node Nx+1. The voltage distribution circuit 151 may perform voltage distribution to output the first to (x+1)-th interpolation voltage levels IV1 to IVx+1 of the second voltage OV2.

Figure 5:
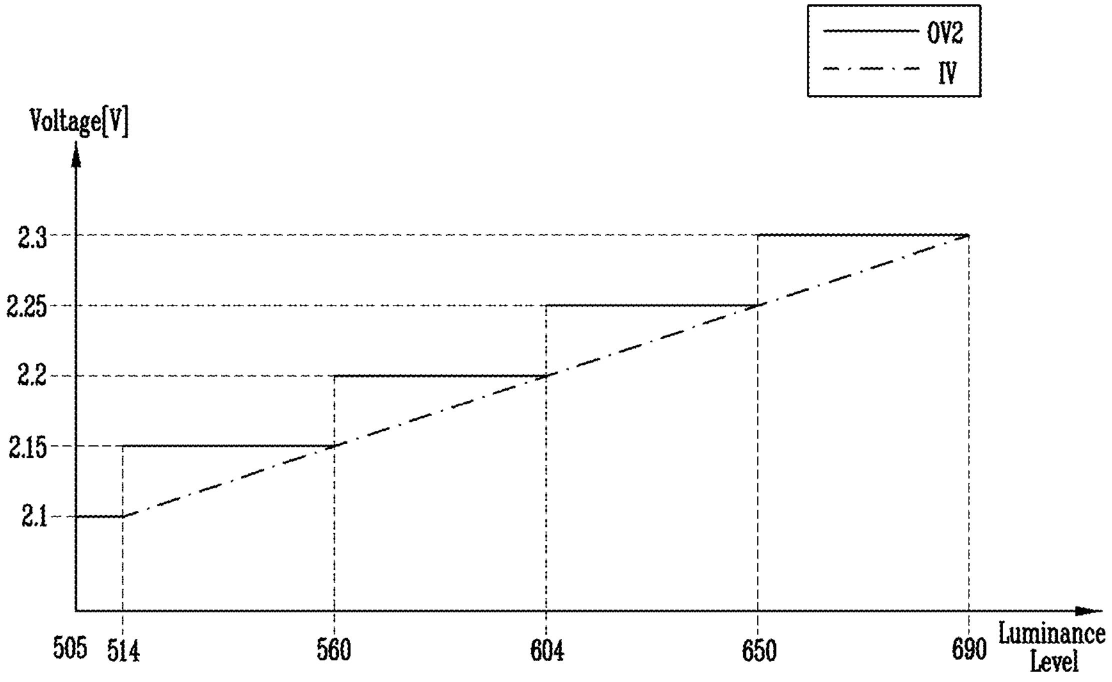
FIG. 5 is a diagram illustrating an embodiment of an output of the voltage interpolator of FIG. 1.

FIG. 5 is a drawing illustrating an embodiment of an output of the voltage interpolator of FIG. 1.

Referring to FIGS. 3 to 5, the second voltage OV2 received by the voltage interpolator 150 and the interpolation voltage levels IV output by the voltage interpolator 150 are shown. FIG. 5 may show an input and an output of the voltage interpolator 150 when the second voltage OV2 is the second power voltage transmitted to the second power voltage node VSSN.

A horizontal axis of FIG. 5 may represent a luminance level and a vertical axis may represent a voltage. A solid line may represent a voltage level of the second voltage OV2 according to a luminance level and a dashed line may represent a voltage level of the interpolation voltage levels IV according to the luminance level.

Since the second voltage OV2 has only a voltage level according to the representative luminance levels, the second voltage OV2 when the luminance level is '514' and '560' may have the same voltage level. In addition, a step size between voltage levels according to the representative luminance level may be large. Referring to FIG. 5, a step size of the second voltage OV2 may be 0.5 V.

The interpolation voltage levels IV may be generated by performing voltage distribution on the (k+1)-th voltage level and the k-th voltage level by the voltage distribution circuit 151. The interpolation voltage levels IV may have voltage levels between the (k+1)-th voltage level and the k-th voltage level.

The interpolation voltage level IV when the luminance level is '514' may be different from that when the luminance level is '515'. Accordingly, a step size of the interpolation voltage levels IV may be less than the step size of the second voltage OV2.

That is, the display device may prevent deterioration of luminance uniformity according to an image brightness value by providing voltages corresponding to the luminance levels to the pixel.

Figure 6:
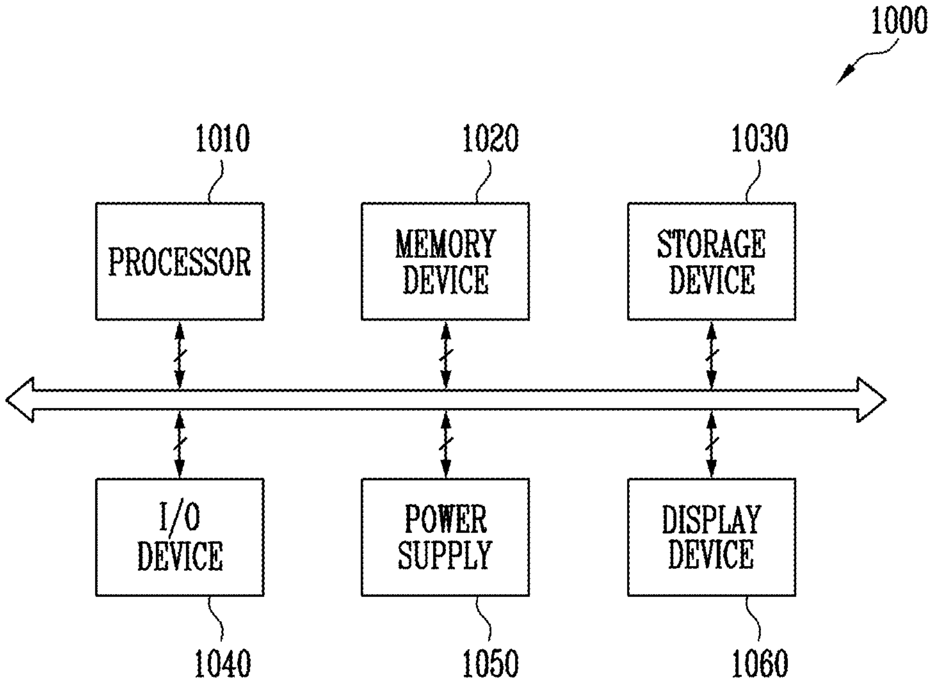
FIG. 6 is a block diagram illustrating an electronic device according to embodiments of the disclosure.
Figure 7:
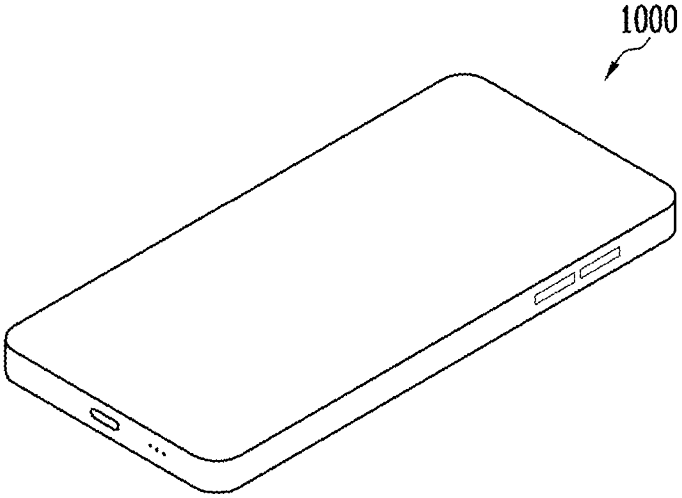
FIG. 7 is a diagram illustrating an example in which the electronic device of FIG. 6 is implemented as a smartphone.

FIG. 6 is a block diagram illustrating an electronic device according to embodiments of the disclosure, and FIG. 7 is a diagram illustrating an example in which the electronic device of FIG. 6 is implemented as a smartphone.

Referring to FIGS. 6 and 7, the electronic device 1000 may include a processor 1010, a memory device 1020, a storage device 1030, an input/output device 1040, a power supply 1050, and a display device 1060. The display device 1060 may be the display device of FIG. 1. In addition, the electronic device 1000 may further include several ports capable of communicating with a video card, a sound card, a memory card, a USB device, or the like, or communicating with other systems. In an embodiment, as shown in FIG. 7, the electronic device 1000 may be implemented as a smart phone. However, this is an exemplary, and the electronic device 1000 is not limited thereto. For example, the electronic device 1000 may be implemented as a mobile phone, a video phone, a smart pad, a smart watch, a tablet PC, a vehicle navigation device, a computer monitor, a notebook computer, a head mounted display device, or the like.

The processor 1010 may perform specific calculations or tasks. According to an embodiment, the processor 1010 may be a microprocessor, a central processing unit, an application processor, or the like. The processor 1010 may be connected to other components through an address bus, a control bus, a data bus, or the like. According to an embodiment, the processor 1010 may also be connected to an expansion bus such as a peripheral component interconnect (PCI) bus.

In an embodiment, the processor 1010 may provide input image data to the display device 1060. Hence, the display device 1060 may display an image based on the input image data provided from the processor 1010.

The memory device 1020 may store data necessary for an operation of the electronic device 1000. For example, the memory device 1020 may include a non-volatile memory device such as an erasable programmable read-only memory (EPROM) device, an electrically erasable programmable read-only memory (EEPROM) device, a flash memory device, a phase change random access memory (PRAM)

device, a resistance random access memory (RRAM) device, a nano floating gate memory (NFGM) device, a polymer random access memory (PoRAM) device, a magnetic random access memory (MRAM), and a ferroelectric random access memory (FRAM) device, a volatile memory device such as a dynamic random access memory (DRAM) device, a static random access memory (SRAM) device, and a mobile DRAM device, and/or the like.

The storage device 1030 may include a solid state drive (SSD), a hard disk drive (HDD), a CD-ROM, and the like.

The input/output device 1040 may include an input means such as a keyboard, a keypad, a touch pad, a touch screen, and a mouse, and an output means such as a speaker and a printer. According to an embodiment, the display device 1060 may be included in the input/output device 1040.

The power supply 1050 may supply power necessary for an operation of the electronic device 1000. For example, the power supply 1050 may be a power management integrated circuit (PMIC).

The display device 1060 may display an image corresponding to visual information of the electronic device 1000. The display device 1060 may be an organic light emitting display device or a quantum dot light emitting display device, but is not limited thereto. The display device 1060 may be connected to other components through the buses or other communication links.

The scope of the disclosure should not be limited to the contents described in the detailed description of the specification, but should be determined by the scope of the patent claims. It should be interpreted that all changes or modifications derived from the meaning, scope of the patent claims, and their equivalent concepts are included in the scope of the disclosure.

What is claimed is:

1. A display device comprising:

a display panel including a plurality of sub-pixels;

a voltage generator configured to generate a first voltage including first voltage levels, the first voltage levels corresponding to representative luminance levels among luminance levels; and a voltage interpolator configured to output interpolation voltage levels corresponding to the luminance levels of the display panel based on the first voltage levels, wherein the luminance levels are values obtained by converting luminances of an image displayed on the display panel into a digital form, and wherein the voltage interpolator comprises:

a voltage distribution circuit including y resistors connected in series between a first node and a ground node, and outputting the interpolation voltage levels, where y is a natural number greater than 1;

a first voltage output circuit receiving a k-th voltage level corresponding to a k-th representative luminance level among the representative luminance levels from the voltage generator, and outputting the k-th voltage level to one of a plurality of nodes between the first node and the ground node according to the number of luminance levels between the k-th representative luminance level and a (k+1)-th representative luminance level among the representative luminance levels, where k is a natural number greater than 1; and a second voltage output circuit receiving the (k+1)-th voltage level corresponding to the (k+1)-th representative luminance level from the voltage generator and outputting the (k+1)-th voltage level to the first node.

2. The display device according to claim 1, wherein the voltage distribution circuit performs voltage distribution on the k-th voltage level and the (k+1)-th voltage level to generate the interpolation voltage levels, and wherein the interpolation voltage levels have a voltage level between the k-th voltage level and the (k+1)-th voltage level.

3. The display device according to claim 2, wherein the number of luminance levels between the k-th representative luminance level and the (k+1)-th representative luminance level and the number of the interpolation voltage levels output from the voltage distribution circuit are the same.

4. The display device according to claim 3, wherein the first voltage output circuit outputs the k-th voltage level to one of the plurality of nodes between the first node and the ground node so that a value obtained by subtracting the k-th representative luminance level from the (k+1)-th representative luminance level is equal to the number of resistors connected between the one of a plurality of nodes and the first node, where k is a natural number greater than 1 and less than y.

5. The display device according to claim 4, wherein the first voltage output circuit includes a demultiplexer.

6. The display device according to claim 4, wherein the first voltage is one of a voltage for initializing an anode electrode of a light emitting element included in the sub-pixel, a turn-off voltage for an N-type transistor included in the sub-pixel, and a voltage for initializing a gate electrode of a driving transistor included in the sub-pixel.

7. The display device according to claim 6, wherein the driving transistor generates a driving current flowing from a first power voltage node to which a first power voltage is provided to a second power voltage node to which a second power voltage is provided.

8. The display device according to claim 7, wherein the voltage interpolator outputs the interpolation voltage levels corresponding to the luminance levels of the display panel based on second voltage levels of a second voltage from an outside, and wherein the second voltage levels correspond to the representative luminance levels.

9. The display device according to claim 8, wherein the second voltage is one of the second power voltage and a turn-on voltage of a P-type transistor included in the sub-pixel.

10. The display device according to claim 4, wherein the y is equal to a greatest value among the values obtained by subtracting the k-th representative luminance level from the (k+1)-th representative luminance level.

11. The display device according to claim 4, wherein a voltage level difference between adjacent interpolation voltage levels is equal to each other.

12. The display device according to claim 11, wherein the voltage level difference between the adjacent interpolation voltage levels is less than a voltage level difference between the k-th voltage level and the (k+1)-th voltage level.

13. The display device according to claim 4, further comprising:

a controller configured to output a first voltage control signal to the voltage generator and a second voltage control signal to the voltage interpolator.

14. The display device according to claim 13, wherein the first voltage output circuit receives a control signal including information on the k from the controller, and wherein the control signal is included in the second voltage control signal.

15. An electronic device, comprising:

a processor to provide input image data; and a display device to display an image based on the input image data, wherein the display device comprising:

a display panel including a plurality of sub-pixels;

a voltage generator configured to generate a first voltage including first voltage levels, the first voltage levels corresponding to representative luminance levels among luminance levels; and a voltage interpolator configured to output interpolation voltage levels corresponding to the luminance levels of the display panel based on the first voltage levels, and wherein the luminance levels are values obtained by converting luminances of an image displayed on the display panel into a digital form, and wherein the voltage interpolator comprises:

a voltage distribution circuit including y resistors connected in series between a first node and a ground node, and outputting the interpolation voltage levels, where y is a natural number greater than 1;

a first voltage output circuit receiving a k-th voltage level corresponding to a k-th representative luminance level among the representative luminance levels from the voltage generator, and outputting the k-th voltage level to one of a plurality of nodes between the first node and the ground node according to the number of luminance levels between the k-th representative luminance level and a (k+1)-th representative luminance level among the representative luminance levels, where k is a natural number greater than 1; and a second voltage output circuit receiving the (k+1)-th voltage level corresponding to the (k+1)-th representative luminance level from the voltage generator and outputting the (k+1)-th voltage level to the first node.

16. The electronic device according to claim 15, wherein the voltage distribution circuit performs voltage distribution on the k-th voltage level and the (k+1)-th voltage level to generate the interpolation voltage levels, and wherein the interpolation voltage levels have a voltage level between the k-th voltage level and the (k+1)-th voltage level.

17. The electronic device according to claim 16, wherein the number of luminance levels between the k-th representative luminance level and the (k+1)-th representative luminance level and the number of interpolation voltage levels output from the voltage distribution circuit are the same.

18. The electronic device according to claim 17, wherein the first voltage output circuit outputs the k-th voltage level to one of the plurality of nodes between the first node and the ground node so that a value obtained by subtracting the k-th representative luminance level from the (k+1)-th representative luminance level is equal to the number of resistors connected between the one of a plurality of nodes and the first node, where the k is a natural number greater than 1 and less than y.

* * * * *